Patented Dec. 15, 1942

2,305,417

UNITED STATES PATENT OFFICE

2,305,417

CRYSTAL-CONTAINING RESINOUS MATERIALS

Otto Hansen, Yonkers, N. Y., assignor to Alexine Novelty Corp., Hudson County, N. J., a corporation of New Jersey No Drawing. Application November 18, 1940, Serial No. 366,144

8 Claims. (Cl. 260—38)

The present invention is directed to cast phenol-formaldehyde resins and more particularly to a composition and a method of making the same, whereby the final product contains crystals of predetermined character and amount.

It has been customary in the art to make compositions of this type wherein insoluble material appeared. Usually, such compositions were entirely opaque. In some instances, it was attempted to add insoluble matter in limited amounts in order to cause the same to be disseminated throughout the article. However, because of the nature of such added insoluble substances and the methods necessarily used for casting and hardening the article, it was practically impossible to obtain a uniform dissemination of the material throughout the same. It was also almost impossible to predetermine the amount and character of the insoluble material which would give desired effects.

The present invention is intended and adapted to overcome the difficulties and disadvantages of the prior art and to provide a method of making cast phenol-formaldehyde compositions in which crystals of insoluble materials are disseminated uniformly throughout the mass.

It is also among the objects of the present invention to provide a method whereby the amount and character of the insoluble matter may be predetermined and in which the same results may be duplicated without difficulty.

In practicing the invention, I first form the liquid condensation product of phenol and formaldehyde in the presence of an alkaline catalyst. As the essential feature of the present invention, the catalyst consists of a mixture of sodium hydroxide and potassium hydroxide. The relative proportions of the two alkaline hydroxides is of considerable importance in determining the amount and character of the crystals to be formed in the finished product. To the initial liquid condensation product, a substantial amount of phthalic anhydride is added, the solution is evaporated to remove water, and the liquid resin is cast into molds and cured. At the time of casting, the liquid is clear, but as the curing progresses, there is precipitated throughout the mass crystals of rather intricate design which appear to be of the hexagonal type and resemble snow flakes very closely. By varying the relative amounts of sodium hydroxide and potassium hydroxide, the amount of these crystals may be varied at will.

The following examples will illustrate the operation of the present invention:

Example I 250 grams of 100% phenol is mixed with 608 grams of a 37% solution of formaldehyde in water. A mixture consisting of 3.75 grams of sodium hydroxide and 3.75 grams of potassium hydroxide is dissolved in 25 cc. of water. This solution is added to the mixture of phenol and formaldehyde and is heated usually on an open flame with a water-cooled reflux condenser attached to the apparatus, until the solution begins to boil. Thereafter, the flame is removed and the boiling is continued for 25 to 30 minutes. Heat is applied only from time to time when the vigor of the boiling tends to diminish.

At the completion of this operation, 30 grams of phthalic anhydride dissolved in ethyl alcohol is added to the liquid condensation product. The solution is then subjected to low temperature distillation, preferably with a high vacuum in order to remove practically all of the water from the solution, which remains clear and transparent. The liquid resin is poured into molds, which are placed in a curing oven starting with a temperature of 55° C., the temperature being gradually increased to about 80° C. over a period of four days, after which the curing is complete.

At the beginning of the curing operation, the resin is clear, but after some time crystals begin to appear disseminated uniformly throughout the entire mass. As the curing progresses, the crystals grow in size until they become quite large and masses of crystals have grown until they are substantially contiguous. When the curing is complete, the article is to a large extent translucent, but not transparent, with transparent portions showing to some exent. When thin articles are made from the cured condensation product, light passing through the same shows a beautiful arrangement of crystals which is highly desirable for decorative purposes.

Example II

The same mixture of phenol and formaldehyde is made as set forth in Example I, but the alkaline catalyst consists of 0.5 gram of sodium hydroxide and 7.0 grams of potassium hydroxide. The entire operation is conducted exactly as set forth in Example I, the resulting product being practically transparent, but having relatively few crystals uniformly distributed throughout the cured condensation product. When articles of relatively large size are made with this product, a considerable number of the individual crystals are readily visible and they give a very attractive effect.

Example III

The same procedure is followed as in Examples I and II with the difference that the proportion of the hydroxides used is different. In this composition, 2.0 grams of sodium hydroxide and 5.5 grams of potassium hydroxide are used as the alkaline condensing agent. After the curing operation, a moderate number of crystals are to be found uniformly distributed throughout the entire mass. From a composition of this kind, articles of general use may be made, since the number of crystals present therein is such that they give an attractive appearance both in thin articles and articles of relatively large cross-section.

From the examples given above, it will be noted that when the amount of sodium hydroxide is equal to the potassium hydroxide present, the amount of crystalline matter in the finished product is quite large. This represents the maximum allowable for the effects obtained by the present invention. As one reduces the amount of sodium hydroxide and increases the amount of potassium hydroxide, the total quantity remaining constant, less and less crystals are formed and different effects are obtained. It is believed that for all practical purposes, the minimum amount of sodium hydroxide to give the desired effects is 0.5 gram, as set forth in Example II.

The crystals which are deposited are most likely compounds of phthalic anhydride. They are not the phthalic anhydride itself, since this compound crystallizes usually in the form of needles and in the rhombic system. It would appear that the crystals deposited in accordance with the present invention are of the hexagonal system and are almost identical with snowflakes. Therefore, it appears quite certain that a new compound has been formed and precipitated.

Since the presence of a specified amount of sodium hydroxide appears to be necessary for the production of the desired crystals, it is assumed that a sodium compound of phthalic anhydride is formed. It is possible that sodium hydrogen phthalate is the substance so precipitated, but it is also probable that a mixed salt, namely, sodium-potassium-phthalate, may be formed in the reaction and precipitated during the curing. However, the present invention is not limited to any specific compound which may be formed as the insoluble crystals.

Although I have described my invention setting forth several specific embodiments thereof, it is not essential that all of the details of the process be employed in all respects. For instance, although in each of the examples the total amount of alkaline condensing agent is uniformly 7.5 grams, considerable variation in the total amount of condensing agent is permissible. For instance, I have found that between the limits of 3.75 grams and 8.75 grams of mixed alkalies, the operation proceeds perfectly. When the lower amounts are used, the reaction is somewhat slower than when the higher amounts are used, but the end result is satisfactory. It is not absolutely essential to use a vacuum in the distillation of the water as other distillation methods may be used. Nor is it essential that all of the water be removed from the composition, as the presence of a small amount of water does not interfere with the results obtained. The proportion of phthalic anhydride added may be varied within a considerable range with good results, and the ratio of phenol to formaldehyde may likewise be varied as is well known. Also, the conditions used in the condensation and reaction of the several ingredients may be changed and the curing time and temperatures may also be varied in accordance with usual practice.

These and other changes in the details may be made within the spirit of the invention, which is to be broadly construed and not to be limited except by the claims appended hereto.

What I claim is:

1. A method of making crystal containing resinous materials which comprises causing a reaction to take place between a phenol and formaldehyde in the presence of an alkaline condensing medium to form an initial liquid condensation product, said medium consisting of a mixture of sodium and potassium hydroxides, the ratio of sodium hydroxide to potassium hydroxide ranging from about 1:1 to about 1:14, adding phthalic anhydride thereto, evaporating the resultant solution to dehydrate the same, and curing at elevated temperatures to permanently harden the same, whereby crystals are formed therein which are substantially uniformly disseminated through the transparent product.

2. A method of making crystal containing resinous materials which comprises causing a reaction to take place between a phenol and formaldehyde in the proportions of approximately 1 mol of phenol to 2.5 mols of formaldehyde in the presence of an alkaline condensing medium to form an initial liquid condensation product, said medium consisting of a mixture of sodium and potassium hydroxides, the ratio of sodium hydroxide to potassium hydroxide ranging from about 1:1 to about 1:14, adding phthalic anhydride thereto, evaporating the resultant solution to dehydrate the same, and curing at elevated temperatures to permanently harden the same, whereby crystals are formed therein which are substantially uniformly disseminated through the transparent product.

3. A method of making crystal containing resinous materials which comprises causing a reaction to take place between a phenol and formaldehyde in the presence of an alkaline condensing medium to form an initial liquid condensation product, said medium consisting of a mixture of sodium and potassium hydroxides, the ratio of sodium hydroxide to potassium hydroxide ranging from about 1:1 to about 1:14, adding phthalic anhydride thereto, evaporating the resultant solution to dehydrate the same, and curing at elevated temperatures to permanently harden the same, whereby crystals are formed therein which are substantially uniformly disseminated through the transparent product, the volume of crystals increasing with increasing proportions of sodium hydroxide.

4. A method of making crystal containing resinous materials which comprises causing a reaction to take place between a phenol and formaldehyde in the proportions of 250 grams of phenol to approximately 600 grams of 37% formaldehyde in the presence of an alkaline condensing medium to form an initial liquid condensation product, said medium consisting of a mixture of sodium and potassium hydroxides in an amount ranging from 3.75 to 8.75 grams, the ratio of sodium hydroxide to potassium hydroxide ranging from about 1:1 to about 1:14, adding phthalic anhydride thereto, evaporating the resultant solution to dehydrate the same, and cur- 5. Crystal-containing resinous material comprising a heat-hardened, transparent phenol-formaldehyde condensation product produced by causing a reaction to take place between a phenol and formaldehyde in the presence of an alkaline condensing medium to form an initial liquid condensation product, said medium consisting of a mixture of sodium and potassium hydroxides, the ratio of sodium hydroxide to potassium hydroxide ranging from about 1:1 to about 1:14, adding phthalic anhydride thereto, evaporating the resultant solution to dehydrate the same, and curing at elevated temperatures to permanently harden the same, whereby crystals are formed therein which are substantially uniformly disseminated through the transparent product.

6. Crystal-containing resinous material comprising a heat-hardened, transparent phenol-formaldehyde condensation product produced by causing a reaction to take place between a phenol and formaldehyde in the proportions of approximately 1 mol of phenol to 2.5 mols of formaldehyde in the presence of an alkaline condensing medium to form an initial liquid condensation product, said medium consisting of a mixture of sodium and potassium hydroxides, the ratio of sodium hydroxide to potassium hydroxide ranging from about 1:1 to about 1:14, adding phthalic anhydride thereto, evaporating the resultant solution to dehydrate the same, and curing at elevated temperatures to permanently harden the same, whereby crystals are formed therein which are substantially uniformly disseminated through the transparent product.

7. Crystal-containing resinous material comprising a heat-hardened, transparent phenol-formaldehyde condensation product produced by causing a reaction to take place between a phenol and formaldehyde in the presence of an alkaline condensing medium to form an initial liquid condensation product, said medium consisting of a mixture of sodium and potassium hydroxides, the ratio of sodium hydroxide to potassium hydroxide ranging from about 1:1 to about 1:14, adding phthalic anhydride thereto, evaporating the resultant solution to dehydrate the same, and curing at elevated temperatures to permanently harden the same, whereby crystals are formed therein which are substantially uniformly disseminated through the transparent product, the volume of crystals increasing with increasing proportions of sodium hydroxide.

8. Crystal-containing resinous material comprising a heat-hardened, transparent phenol-formaldehyde condensation product produced by causing a reaction to take place between a phenol and formaldehyde in the proportions of 250 grams of phenol to approximately 600 grams of 37% formaldehyde in the presence of an alkaline condensing medium to form an initial liquid condensation product, said medium consisting of a mixture of sodium and potassium hydroxides in an amount ranging from 3.75 to 8.75 grams, the ratio of sodium hydroxide to potassium hydroxide ranging from about 1:1 to about 1:14, adding phthalic anhydride thereto, evaporating the resultant solution to dehydrate the same, and curing at elevated temperatures to permanently harden the same, whereby crystals are formed therein which are substantially uniformly disseminated through the transparent product.

OTTO HANSEN.